(No Model.)
I. BOUTELL.
COFFEE OR TEA POT.
No. 389,790. Patented Sept. 18, 1888.
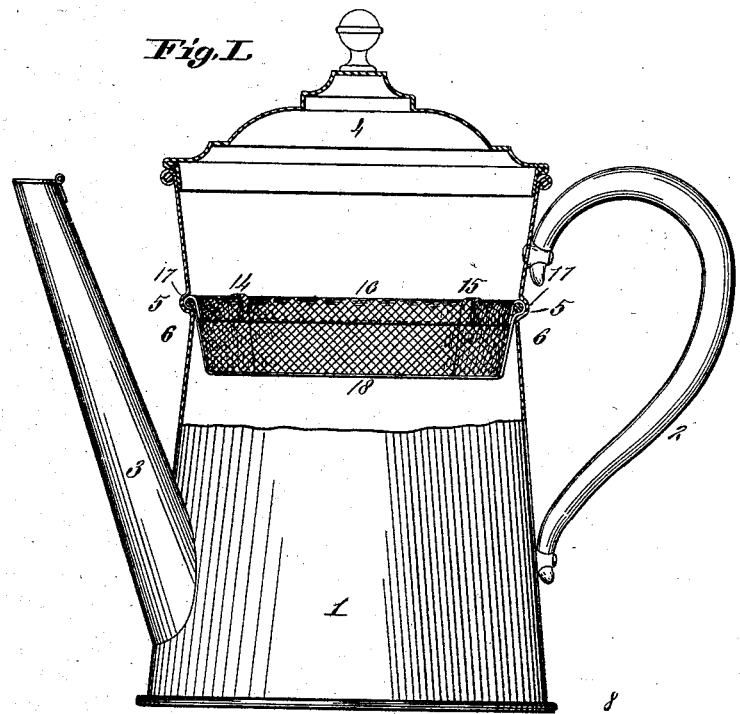
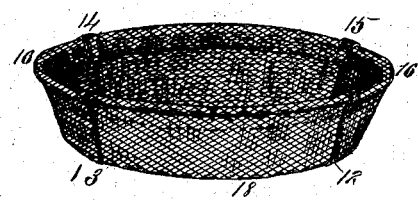
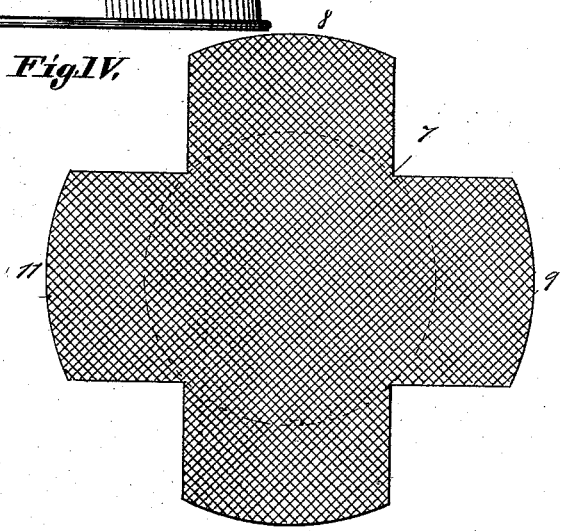
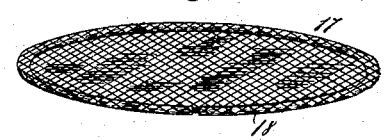
Attest:
Charles Pickles
Emma Arthur
Inventor:
Ira Boutell
By Knight Bros
attys

United States Patent Office.

IRA BOUTELL, OF ST. LOUIS, MISSOURI.

COFFEE OR TEA POT.

SPECIFICATION forming part of Letters Patent No. 389,790, dated September 18, 1888.

Application filed October 4, 1887. Serial No. 251,466. (No model.)

*To all whom it may concern:*

Be it known that I, IRA BOUTELL, of the city of St. Louis, in the State of Missouri, have invented a certain new and useful Improvement in Coffee or Tea Pots, of which the following is a full, clear, and exact description, reference being had to the accompanying drawings, forming part of this specification, and in which—

Figure I is a part side view and part vertical section of my improved coffee or tea pot. Fig. II is a perspective view of the open ring of the sack. Fig. III is a perspective view of a sack for holding the coffee or tea. Fig. IV is a plan view of the sack. Fig. V represents a modification.

My invention relates to an improvement in percolating coffee or tea pots; and my invention consists in features of novelty, hereinafter fully described, and pointed out in the claims.

Referring to the drawings, 1 represents the body of the pot; 2, the handle; 3, the spout, and 4 the lid. A groove, 5, is formed in the body of the pot a short distance below the top. Just beneath the groove 5 the pot is of somewhat smaller diameter than it is just above the groove. This forms a shoulder, 6, the use of which will be spoken of hereinafter. Above and below the groove 5 the pot is made flaring, increasing in diameter toward the top and toward the bottom. The upper taper forms a bearing, down which the ring in the sack (hereinafter mentioned) slides and is pressed as the sack is inserted, and the lower taper a large chamber or space, which allows the sack (when the pot is tilted) to swing out of line, so that the contents of the bag are less liable to be discharged when pouring the liquid.

7 represents the fabric of which the sack is made. As shown in Fig. IV, the fabric has four gores, which leaves four nearly square pieces, 8, 9, 10, and 11, extending from the body of the fabric. The four pieces are bent up at right angles to the body, and in so doing the edges of the adjoining pieces come together, where they may be sewed, making seams 12, 13, 14, and 15. After these seams have been made the top is folded back upon itself and sewed, forming a pocket, 16. (See Fig. III.)

17 is an open ring, preferably made of metal, and nickel or silver plated to prevent its rusting. This ring is inserted into the pocket 16 at the top of the sack. The sack, being made in the manner described, has a flat bottom, 18, thus giving surface enough for the coffee or tea, so that the water will pass through readily. When the sack has been made in the manner shown in Fig. III, it is placed in the pot, as shown in Fig. I, where it is securely held by the open ring 17, fitting into the groove 5, and is prevented from passing below the groove by the shoulder 6. Before reaching the groove the open ring is contracted slightly by the taper of the body of the pot above the groove, and when it reaches the groove it springs open into it, holding the sack from moving in either direction, up or down.

When it is desired to remove the sack for the purpose of cleaning, &c., all that is necessary to do is to slightly compress the open ring and remove it from the groove.

In the modification shown in Fig. V the fabric 18 is stretched tight, making a flat strainer instead of a sack.

I claim as my invention—

1. In a coffee or tea pot, the combination of the body having the reverse tapers and a sack having a ring in its top that bears against the upper taper of the body as the sack is inserted, substantially as and for the purpose set forth.

2. In a coffee or tea pot, the combination of the body having reverse tapers and a groove at the junction of said tapers, and a sack having a compressible ring, substantially as and for the purpose set forth.

In testimony whereof I affix my signature in presence of two witnesses.

IRA BOUTELL.

In presence of—
JAS. E. KNIGHT,
EDWD. S. KNIGHT.